(12) United States Patent
Simon et al.

(10) Patent No.: US 6,570,486 B1
(45) Date of Patent: May 27, 2003

(54) PASSIVE REMOTE ACCESS CONTROL SYSTEM

(75) Inventors: Marc R. Simon, Whitefish Bay, WI (US); Francois Lhomme, Wolfisheim (FR); Christophe Leligne, Wolxheim (FR)

(73) Assignee: Delphi Automotive Systems, Troy, MI (US)

( * ) Notice: Subject to any disclaimer, the term of this patent is extended or adjusted under 35 U.S.C. 154(b) by 0 days.

(21) Appl. No.: 09/289,441

(22) Filed: Apr. 9, 1999

(51) Int. Cl.[7] .............................................. G05B 19/00
(52) U.S. Cl. ........................ 340/5.1; 340/5.2; 340/10.1; 340/825.69; 340/825.72; 340/426; 307/10.2; 701/2
(58) Field of Search ......................... 340/5.1, 5.2, 10.1, 340/825.69, 825.72, 426; 307/10.2; 701/2

(56) References Cited

U.S. PATENT DOCUMENTS

| | | |
|---|---|---|
| 4,258,421 A | 3/1981 | Juhasz et al. |
| 4,754,255 A | 6/1988 | Sanders et al. |
| 4,804,937 A | 2/1989 | Barbiaux et al. |
| 5,091,856 A | 2/1992 | Hasegawa et al. |
| 5,157,610 A | 10/1992 | Asano et al. |
| 5,229,648 A | 7/1993 | Sues et al. |
| 5,278,547 A | 1/1994 | Suman et al. |
| 5,303,163 A | 4/1994 | Ebaugh et al. |
| 5,305,459 A | 4/1994 | Rydel |
| 5,479,157 A | 12/1995 | Suman et al. |
| 5,513,107 A | 4/1996 | Gormley |
| 5,619,412 A | 4/1997 | Hapka |
| 5,736,935 A * | 4/1998 | Lambropoulos ....... 340/825.69 |
| 5,905,431 A * | 5/1999 | Mueller et al. ............. 340/426 |
| 6,101,428 A * | 8/2000 | Snyder .......................... 701/2 |

\* cited by examiner

*Primary Examiner*—Michael Horabik
*Assistant Examiner*—Yves Dalencourt
(74) *Attorney, Agent, or Firm*—George E. Haas; Quarles & Brady LLP

(57) ABSTRACT

Access to a motor vehicle is controlled by periodically transmitting an interrogation signal from a control circuit on the vehicle. Upon receiving the interrogation signal, a hand-held remote control transmits a reply signal to the control circuit. The control circuit measures the strength of the reply signal and the activates a first function, such as unlocking a door of the vehicle, when the strength exceeds a first threshold level. Thereafter, when the signal strength exceeds a second threshold level, the control circuit activates a second function, for example enabling the engine to be started. When the signal strength drops below a third threshold activates a third function, such as locking the door.

17 Claims, 3 Drawing Sheets

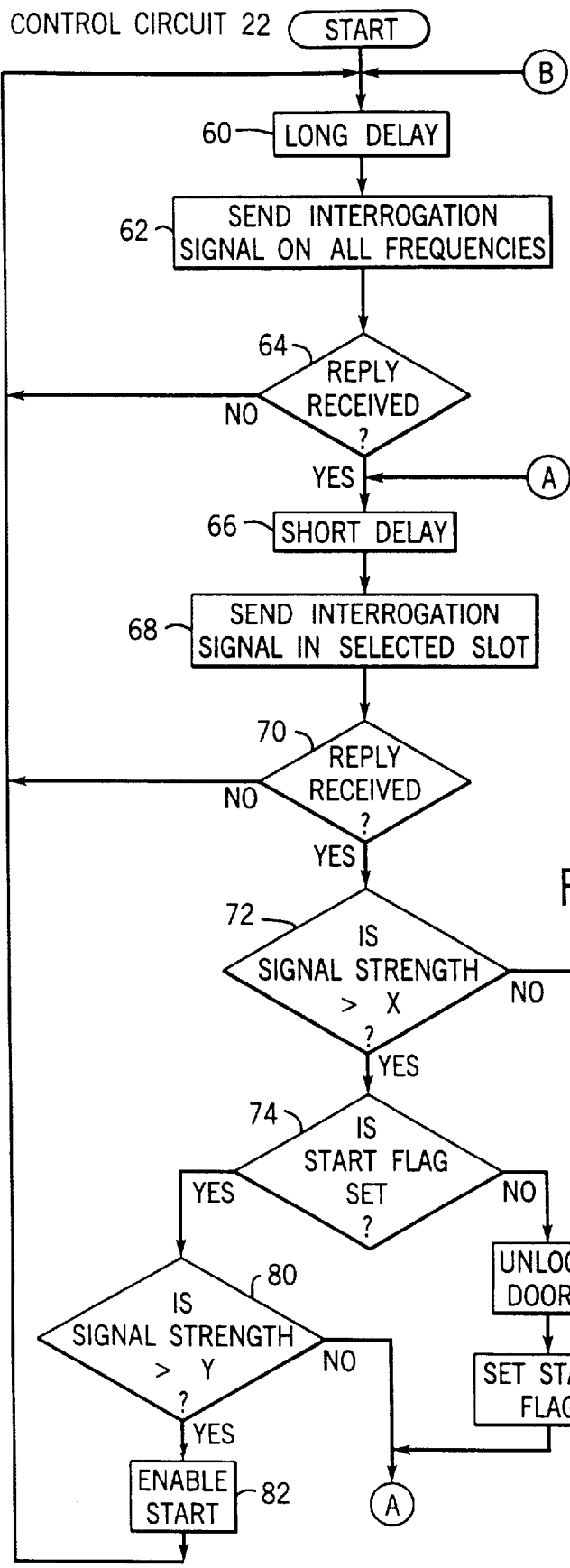
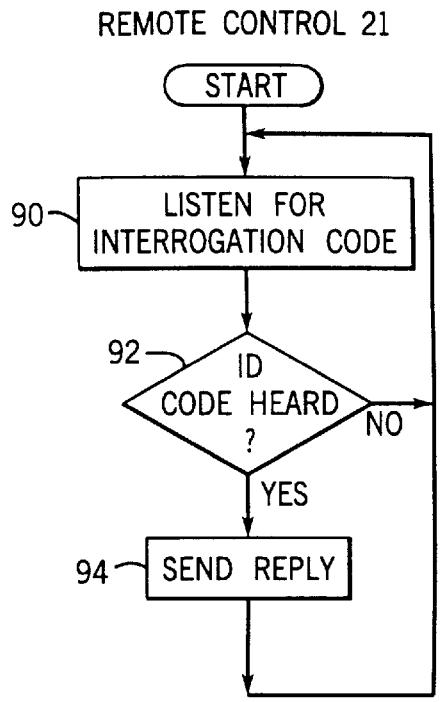
FIG. 4
FIG. 5

PASSIVE REMOTE ACCESS CONTROL SYSTEM

BACKGROUND OF THE INVENTION

The present invention relates to system for remotely controlling access to motor vehicles, and more particularly to wireless remote control systems that can be used to unlock vehicle doors, start the engine and operate other functions on the vehicle.

Automobiles have used keys which mechanically operate locks to limit access to the vehicle and starting the engine to only authorized persons. More recently remote keyless entry (RKE) systems have been provided that use a small radio frequency (RF) transmitter, often having the shape of a key ring fob, to access the vehicle. This RF transmitter has a number of push button switches allowing the driver to control different functions of the vehicle, such as lock and unlock the doors, arm a security system or open the trunk. These transmitters also have been proposed to control starting the vehicle engine. When a given push button switch is operated, the transmitter sends an RF signal which carries a digital numerical code and a designation of the function to be performed. A receiver in the vehicle receives the transmitter signal, verifies that the numerical code designates an authorized transmitter for that particular vehicle and if so, signals the vehicle control circuits to perform the prescribed function.

Although the digital numerical code makes it extremely difficult for unauthorized persons to gain access to the motor vehicle, concern has been expressed that someone with a radio receiver and a digital signal analyzer could eavesdrop on the radio transmissions and obtain the security numbers. Particular brands of vehicles use a specific single radio frequency. Thus a thief could "stake out" a valuable vehicle to await the return of the driver and learn the transmission necessary to operate the vehicle. Those security numbers then could be utilized to steal that vehicle at a later point in time. Thus, as the technology available to thieves advances, so too must the signal processing employed by the RKE system. Therefore, there exists a need for a more secure radio frequency system that allows keyless entry.

Bidirectional radio frequency communication has been used for some time in cordless telephones. The term "cordless telephone" as used in the telecommunication industry, means a telephone comprising a base station and a hand-held transceiver unit. The base station is connected by wires to a terrestrial telephone line serving the owner's premises. A hand-held transceiver carried by the user communicates by radio frequency signals with the single base station that is up to approximately 300 meters away.

The Digital Enhanced Cordless Telecommunications (DECT) protocol was developed in the mid-1980's as a pan-European standard for cordless telephones and has been adapted for use outside the European Union. The DECT standard protocol has been used for simultaneous bidirectional communication between a base station and a hand-held transceiver of cordless telephones. This standard utilizes ten frequencies for communication. The exchange of signals over each frequency is divided into frames 10 each having twenty-four slots as shown in FIG. 1. The twelve slots in the first half 14 of each frame are used for communication from a hand-held transceiver to the associated base station, while the twelve slots in the second frame half 16 are used for communication from the base station and the hand-held transceiver.

When a user desires to use activates the cordless telephone to make an outgoing call, the hand-held transceiver searches for a frequency that has a matching slots in each frame half which are not being used by another cordless telephone system. This is accomplished by the hand-held transceiver listening for digital signals being sent in each slot of the frame at each of the assigned frequencies. When a vacant pair of slots, such as 18 and 19, is found, the hand-held transceiver sends a message initiation signal on the selected frequency during slot 18 in the first half of a message frame.

While the hand-held transceiver is performing these functions, the base station is scanning the ten frequencies and listening during each of the twelve slots in the first half 14 of the message frames at each frequency. When the base station hears a message initiation signal that is addressed to it, i.e. containing the proper identification data, the base station sends a response to the transceiver in the associated slot 19 in the second half of a frame at the same frequency and bidirectional communication is established. A reverse procedure occurs when the base station receives an incoming call via the terrestrial telephone line.

SUMMARY OF THE INVENTION

A general object of the present invention is to provide a remote keyless vehicle entry system which does not require manual activation by the user.

Another object is to provide secure mechanism for enabling a driver to start a motor vehicle without a conventional key.

A further aspect of the present invention is to provide a mechanism for automatically locking the doors upon the driver exiting the motor vehicle.

Still another aspect of the present system allows the vehicle doors and trunk to be unlocked and locked.

These and other objectives are satisfied by a passive keyless access system having a remote control adapted to be carried by the driver. Access to the vehicle is controlled by the remote control transmitting a signal from outside the vehicle to a control circuit on the vehicle. The control circuit measures the strength of the signal and activates a first function of the vehicle when the strength exceeds a first predefined threshold. Thereafter when the strength exceeds a second predefined threshold, the control circuit activates a second vehicle function. For example, the first function can be unlocking a vehicle door and the second function can be enabling the engine to be started. In that example, the first predefined threshold is greater than the second predefined threshold.

In the preferred embodiment of the present invention, transmission of the signals utilizes the Digital Enhanced Cordless Telecommunications (DECT) protocol. As an optional feature the control circuit can activate a third function of the vehicle when the signal strength drops below a third predefined threshold, the control circuit activates a second function of the vehicle, such as locking the doors as the driver has left the vehicle.

BRIEF DESCRIPTION OF THE DRAWINGS

FIG. 4 is a flowchart of the passive entry and starting operations of a control circuit in the motor vehicle; and FIG. 5 is a flowchart of operation of a hand-held remote control.

DETAILED DESCRIPTION OF THE INVENTION

Figure 2:
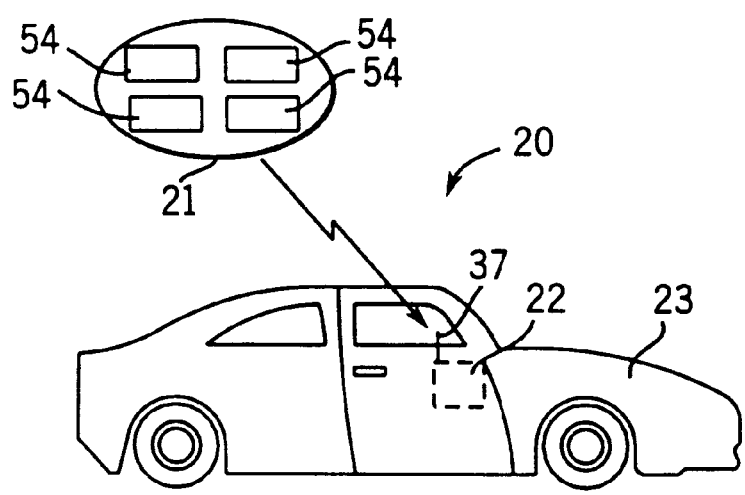
FIG. 2 is a pictorial diagram of a remote keyless entry (RKE) system for a motor vehicle.

With initial reference to FIG. 2, a keyless motor vehicle control system 20 comprises a driver's remote control 21, which preferably has the form of a key ring fob carried by a driver, and a control circuit 22 located in the motor vehicle 23. As will be described, the remote control 21 exchanges a radio frequency signals with the control circuit 22, which responds by activating designated functions of the motor vehicle 23.

Figure 3:
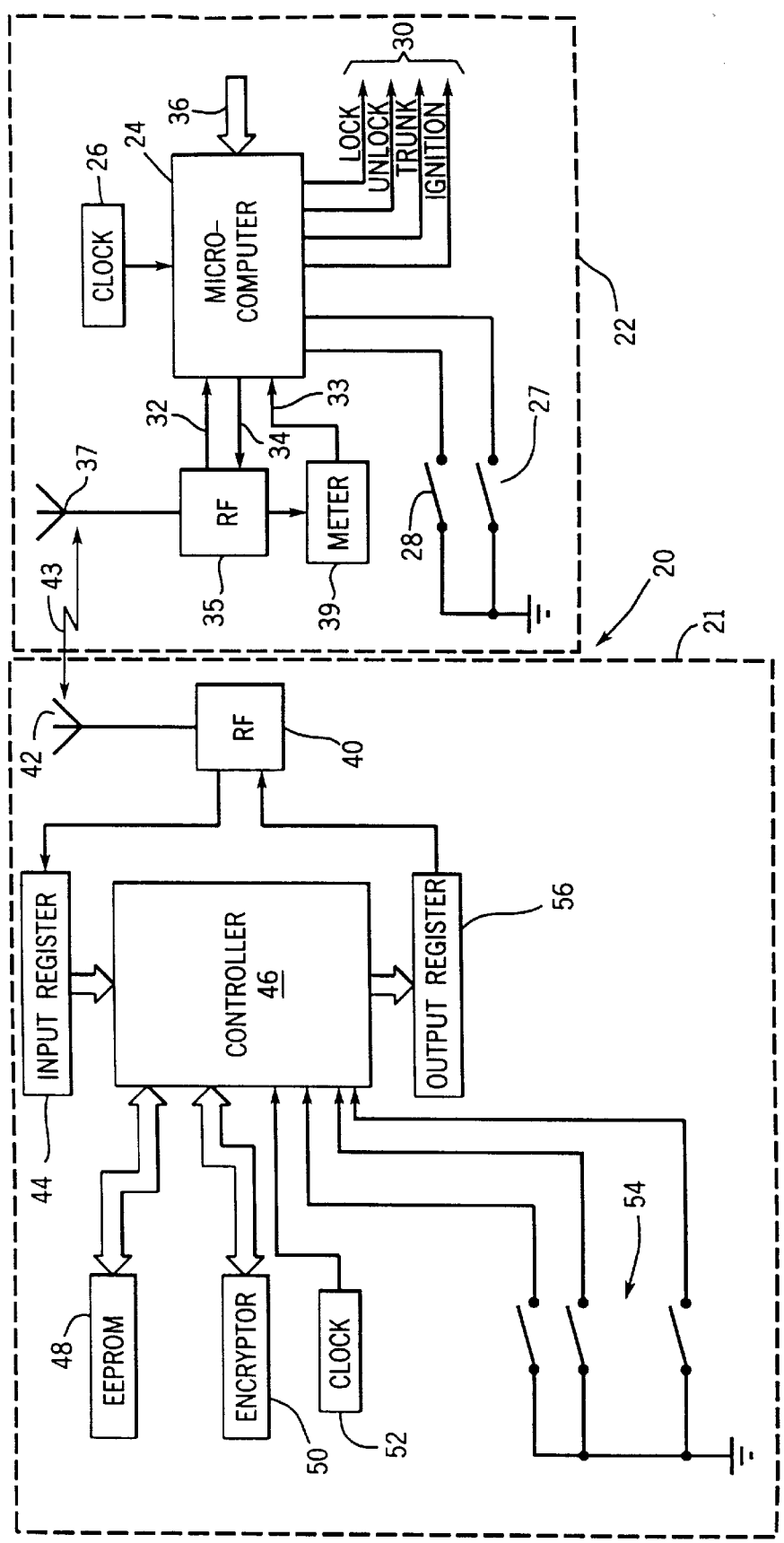
FIG. 3 is a block schematic diagram of the remote keyless entry system.

As shown in detail in FIG. 3, the control circuit 22 in the motor vehicle includes a microcomputer 24 with an internal microprocessor, memory in which the control program and data are stored, and input/output circuits. A standard clock circuit 26 supplies timing pulses to the microcomputer 24. The service technician is able to place the microcomputer into different functional modes by operating a plurality of manual input switches 27 and 28. Alternatively the configuration of the control circuit 22 can be defined by downloading data via the radio frequency link.

The control circuit 22 operates several functions on the motor vehicle, such as locking and unlocking the doors, unlatching the trunk lid, and starting the engine, for example. For that functionality, the microcomputer 24 is interfaced to the corresponding actuating devices on the motor vehicle 23. In some cases, the various functions are controlled by an another computer in the motor vehicle to which microcomputer 24 sends operating commands via a parallel communication bus 36. In other motor vehicles, microcomputer 24 has individual output lines 30 connected directly to the control devices for the respective functions being operated. Specifically, separate wires may be coupled to actuators which lock and unlock the doors, unlatch the trunk lid and start the engine.

A serial output port 32 and a serial input port 34 of the microcomputer 24 are connected to a first radio frequency transceiver 35 which utilizes the Digital Enhanced Cordless Telecommunications (DECT) standard. In a general sense, the first radio frequency transceiver 35 modulates a standard RF frequency carrier with the serial digital data received from output port 32 and transmits that modulated radio frequency signal via an antenna 37. The first transceiver 35 also receives and demodulates radio frequency signals received by the antenna 37 to recover serial digital data carried by that signal. The recovered data is sent to the microcomputer input port 34. A meter 39 is connected to the first transceiver 35 to measure the strength of the received radio frequency signal and provide an indication of that signal strength to microcomputer 24 via another input port 33. Alternatively the circuitry in the remote control 21 also may have a signal strength meter for the radio frequency signal that it receives.

The first transceiver 35 of the control circuit 22 is designed to communicate with a second radio frequency transceiver 40 and antenna 42 both located within the remote control 21. As will be described, both transceivers 40 and 35 are designed to utilize the DECT protocol and are similar to devices found in cordless telephones. The second transceiver 40 has a receiver section which demodulates the received radio frequency signal to recover digital data carried by that signal and the recovered data is sent in a serial format to an input register 44. The input register 44 converts the serial data stream from the second transceiver 40 into a parallel format which is read by a controller 46. The controller 46 may be a hardwired device that sequentially performs the remote control procedure to be described or a programmable device which executes a software program to implement that procedure. The controller 46 of the remote control 21 is connected to an electrically erasable programmable read only memory (EEPROM) 48 which stores data to be transmitted to the motor vehicle control circuit 22 when the remote control 21 is interrogated.

A clock circuit 52 also provides timing signals for the remote control 21. A plurality of user operable switches 54 are connected to different input lines to the controller 46 in order for the driver to select the specific functions to be performed on the motor vehicle. For example, a separate switch can be provided for the functions of unlocking and locking the doors, unlatching the trunk lid, and starting the engine.

The remote control 21 also includes an encryptor 50 connected to the controller 46 to encrypt a remote control security number for transmission to the control circuit 22. The encryptor 50 utilizes a secret-key cryptography algorithm to encrypt data for sending to the control circuit. For example, the algorithm specifies a sequence of a plurality of logical operations which are performed on a known seed number and a challenge number received from the control circuit to produce a resultant number for transmission by the remote control. Several suitable cryptography algorithms are described by Mehrdad Foroozesh in an article entitled "Protecting Your Data With Cryptography," *UNIX Review*, November 1996, volume 14, number 12, page 55(6), which description is incorporated herein by reference. Such encryption techniques and algorithms are commonly used to encrypt computer data being transmitted over common carriers. It should be understood that other encryption techniques may be used.

Digital output data is sent by the controller 46 in parallel form to a parallel-in/serial-out output register 56. The serial data from the output register 56 is applied to the input of a transmitter section in the second transceiver 40 which modulates a radio frequency signal which that data. The resultant RF signal is sent via the antenna 42 to the control circuit 22 in motor vehicle. The signal transmitted by the second transceiver 40 has a range of about 300 meters. The components of the remote control preferably are powered by a battery (not shown).

When the driver desires the vehicle perform a given function the corresponding switch 54 can be operated on the remote control 21. This results in the controller 46 sending a signal to the control circuit 22 which designates the selected function. This communication process is similar to that used in previous remote controls for motor vehicles, except that it employs the DECT protocol. The designation of the selected function is stored in a table within the EEPROM 48 and the functions associated with each switch 54 are programmable via the RF link provided by second transceiver 40.

In addition, the present keyless motor vehicle control system 20 has a passive mode of operation in which the driver does not have to operate a switch 54 on the remote control 21. Instead, a predefined sequence of functions is performed by the driver merely approaching the motor vehicle 23.

Figure 1:
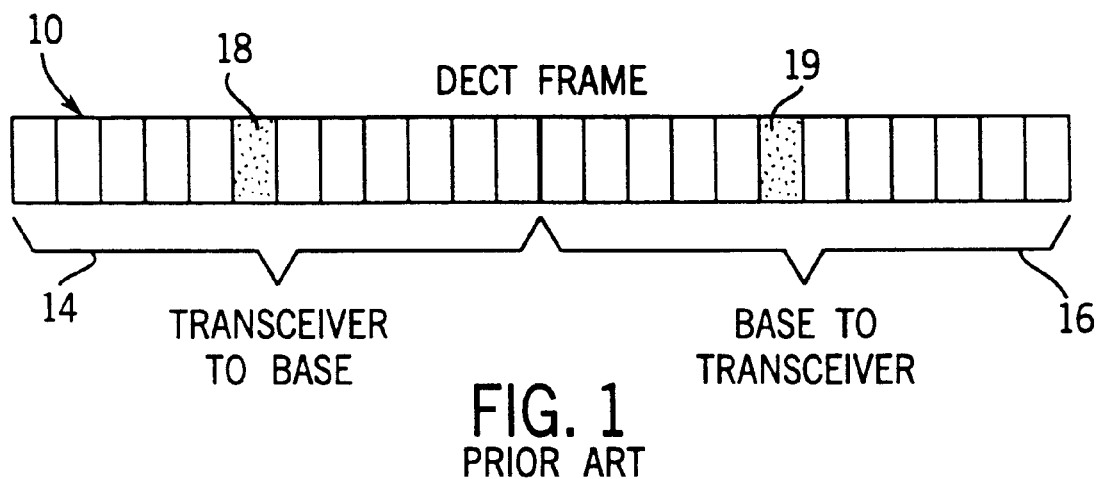
FIG. 1 depicts a message frame of the Digital Enhanced Cordless Telecommunications (DECT) wireless telephone protocol.

With reference to FIGS. 3 and 4, the motor vehicle control circuit 22 in the passive mode periodically, every six seconds for example, emits an interrogation signal at steps 60 and 62. The interrogation signal contains a unique identification code for that particular motor vehicle and is transmitted sequentially on all ten of the DECT frequencies. This process begins by scanning each of the ten DECT frequencies. If the control circuit 22 does not hear a message frame on a given frequency, then it forms a new message frame and selects an arbitrary pair of time slots to use. If a particular frequency already is carrying DECT messages, the control circuit 22 listens during the message frames for an available pair of frame slots, one that does not already contain message data. If none is found, the control circuit 22 selects the next DECT frequency. When an available pair of time slots, such as the third time slots 18 and 19 in each half of the message frame shown in FIG. 1, is found, the control circuit 22 transmits the interrogation signal in the time slot 19 during the second half 16 of the message frame.

The microcomputer 24 determines at step 64 whether a reply signal has been received and if so, whether the reply signal contains an authorized remote control identification number. If either is not the case, the program execution returns to step 60 to delay before sending the interrogation signal again at step 62.

While this is occurring, the remote control 21, at step 90 of FIG. 5, listens on a single DECT frequency for a interrogation signal which contains the proper motor vehicle identification code. Alternatively, the interrogation signal could be sent on a single one of the DECT frequencies by the control circuit 22 and the remote control 21 could scan all of the DECT frequencies listening for that signal. However, with this latter approach the remote control 21 consumes more power which drains its battery faster.

When the driver is within transmission range, for example approximately 300 meters of the motor vehicle 23, the remote control 21 receives interrogation signal and at step 92 determines whether that signal contains the identification code for the motor vehicle that the remote control is to operate. If that is the case, the remote control 21 responds with a predefined reply signal at step 94. The reply signal, is sent at the same frequency as the interrogation signal and during a slot in the second half of the message frame that corresponds to the slot of the first frame half that contained the interrogation signal. That reply contains a unique identification number assigned to the remote control and stored in its EEPROM 48. The reply data is sent via output register 56 to the second transceiver 40 from which it is transmitted to the control circuit 22 in the adjacent motor vehicle. As noted previously, any of several well known data encryption algorithms may be employed to exchange data between the control circuit 22 and the remote control 21 for greater security.

Upon receiving a valid reply signal at step 64 in FIG. 4, the microcomputer 24 in the control circuit 22 advances to steps 66 and 68 at which another interrogation signal begins to be transmitted at shorter intervals, every 60 milliseconds for example. The remote control 21 continues to send a reply signal upon each receipt of this interrogation signal.

At this juncture, the microcomputer 24 determines at step 70 whether a reply signal has been received and if so, whether it contains an authorized remote control identification number. If either is not the case, the program execution returns to step 60 at the beginning of the passive mode. However, when a valid reply signal is received by the control circuit 22 at step 70, the procedure advances to step 72. The microcomputer 24 now examines the input from meter 39 to determine whether the strength of the received reply signal exceeds a predefined first threshold level X, as occurs when the remote control 21 is within a meter of the motor vehicle, for example. If the signal strength is below this first threshold, i.e. the driver is too far from the motor vehicle, the program returns via step 84 to step 66. Alternatively the measurement of the signal strength could be performed at the remote control 21 with an indication of that signal strength being transmitted to the control circuit 22. In yet another variation, both the remote control 21 and the control circuit 22 could measure the strength of their respectively received signals with the control circuit 22 comparing the measurements to determine the proximity of the remote control.

When the signal strength exceeds this first threshold X, microcomputer 24 at step 74 checks whether a flag, designated START FLAG, has been set previously. When the START FLAG has not been set, the doors of the motor vehicle are unlocked at step 76 and the START FLAG then is set at step 78, before the process returns to step 66. If the START FLAG is found set at step 74, the procedure advances to step 80 where the microcomputer 24 examines the input from meter 39 to determine whether the strength of the received reply signal exceeds a predefined second threshold level Y. The strength of the reply signal will exceed the second threshold level Y when the remote control 21 is inside the motor vehicle. In that case, the microcomputer 24 enables the starting circuit of the motor vehicle 23 so that the driver may start the engine by activating a manual switch on the dashboard. Thus the driver with the proper remote control 21 for the motor vehicle may start the engine without using a key. The procedure then returns to step 60. If the signal strength is found to be below threshold Y at step 80, i.e. the driver is not inside the motor vehicle, the program returns to step 66 without enabling the starting circuit.

After the starting circuit has been enabled, the keyless control system 20 continues to exchange interrogation and reply signals between the control circuit 22 and the remote control 21. While the driver is within the motor vehicle, the strength of the reply signal will exceed the first threshold level X at step 72 causing the program execution pass through steps 74, 80 and 82 and return to step 66. Eventually the driver will manually turn-off the engine and exit the motor vehicle 23. As the driver walks away from the vehicle, the signal strength drops below the first threshold level X. When this occurs, the procedure branches to step 84 where the START FLAG is found to be set. As a result, the START FLAG will be reset at step 86 before the doors are locked at step 88. Then the program returns to step 60 to await the driver again approaching the motor vehicle for reentry.

What is claimed is:

1. A method for controlling access to a vehicle which has a door and an engine, that method comprising the steps of:
    (a) periodically transmitting a first interrogation signal at a first rate from a control circuit on the vehicle;
    (b) receiving the first interrogation signal at a remote control that is separate from the vehicle;
    (c) upon receiving the first interrogation signal, transmitting a first reply signal from the remote control;
    (d) receiving the first reply signal at the control circuit;
    (e) after receiving the first reply signal, periodically transmitting a second interrogation signal at a second rate from the control circuit;
    (f) receiving the second interrogation signal at the remote control;
    (g) upon receiving each second interrogation signal, transmitting a second reply signal from the remote control;

(h) receiving each second reply signal at the control circuit;

(i) measuring strength of each second reply signal at the control circuit;

(j) activating a first function of the vehicle when the strength exceeds a first predefined threshold; and (k) activating a second function of the vehicle when the strength exceeds a second predefined threshold.

2. The method as recited in claim 1 wherein transmission of signals utilizes the Digital Enhanced Cordless Telecommunications (DECT) protocol.

3. The method as recited in claim 1 wherein the first rate is slower than the second rate.

4. The method as recited in claim 1 wherein the step of activating a first function comprising unlocking a door of the vehicle.

5. The method as recited in claim 4 wherein the step of activating a second function comprising enabling the engine to be started.

6. The method as recited in claim 5 wherein the first predefined threshold is greater than the second predefined threshold.

7. The method as recited in claim 1 further comprising activating a third function of the vehicle when the strength becomes less than a third predefined threshold.

8. The method as recited in claim 7 wherein the step of activating a third function comprising locking the door of the vehicle.

9. The method as recited in claim 7 further comprising returning to step (a) after activating a third function.

10. A method for controlling access to a vehicle which has a door and an engine, that method comprising the steps of:

(a) periodically transmitting an interrogation signal at a given rate from a control circuit on the vehicle;

(b) receiving the interrogation signal at a remote control that is separate from the vehicle;

(c) upon receiving the interrogation signal, transmitting a reply signal from the remote control;

(d) receiving the reply signal at the control circuit;

(e) measuring strength of the reply signal at the control circuit;

(f) activating a first function of the vehicle when the strength exceeds a first predefined threshold;

(g) after activating the first function, changing the given rate at which the interrogation signal is transmitted, and repeating steps (a) through (e); and (h) thereafter activating a second function of the vehicle when the strength of the reply signal exceeds a second predefined threshold.

11. The method as recited in claim 10 wherein the first predefined threshold is greater than the second predefined threshold.

12. The method as recited in claim 10 wherein the interrogation signal is transmitted more frequently after activating a first function.

13. The method as recited in claim 10 wherein the second predefined threshold is exceeded substantially only when the remote control is inside the vehicle.

14. The method as recited in claim 10 wherein activating a second function comprising enabling the engine to be started.

15. The method as recited in claim 10 wherein activating a first function comprising unlocking a door of the vehicle.

16. The method as recited in claim 10 wherein transmitting a reply signal comprises sending a unique identification number assigned to the remote control; and receiving the reply signal comprises verifying that the unique identification number is valid for operating the vehicle.

17. The method as recited in claim 10 wherein transmitting a reply signal utilizes the Digital Enhanced Cordless Telecommunications (DECT) protocol.

* * * * *